United States Patent
Qu et al.

(10) Patent No.: US 10,663,038 B2
(45) Date of Patent: May 26, 2020

(54) TRANSMISSION METHOD AND DEVICE FOR COAXIALLY OUTPUTTING AUTOROTATION AND REVOLUTION

(71) Applicants: SOUTH CHINA UNIVERSITY OF TECHNOLOGY, Guangzhou (CN); GUANGZHOU HUAXINKE INTELLIGENT MANUFACTURING TECHNOLOGY CO., LTD., Guangzhou (CN)

(72) Inventors: Jinping Qu, Guangzhou (CN); Guizhen Zhang, Guangzhou (CN)

(73) Assignees: SOUTH CHINA UNIVERSITY OF TECHNOLOGY, Guangzhou (CN); GUANGZHOU HUAXINKE INTELLIGENT MANUFACTURING TECHNOLOGY CO., LTD., Guangzhou (CN)

( * ) Notice: Subject to any disclaimer, the term of this patent is extended or adjusted under 35 U.S.C. 154(b) by 157 days.

(21) Appl. No.: 15/569,092

(22) PCT Filed: Jul. 13, 2015

(86) PCT No.: PCT/CN2015/083884
§ 371 (c)(1),
(2) Date: Oct. 25, 2017

(87) PCT Pub. No.: WO2016/183917
PCT Pub. Date: Nov. 24, 2016

(65) Prior Publication Data
US 2018/0119778 A1    May 3, 2018

(30) Foreign Application Priority Data
May 20, 2015  (CN) .......................... 2015 1 0260601

(51) Int. Cl.
*F16H 1/32* (2006.01)
*F16H 37/08* (2006.01)
(Continued)

(52) U.S. Cl.
CPC ........... *F16H 1/32* (2013.01); *B29C 48/2526* (2019.02); *F04C 15/0065* (2013.01);
(Continued)

(58) Field of Classification Search
CPC ............................ F16H 1/32; F16H 2001/323
See application file for complete search history.

(56) References Cited

U.S. PATENT DOCUMENTS

2003/0216213 A1* 11/2003 Yamamoto ................ F16H 1/28
                                                           475/330
2010/0167867 A1*  7/2010 Sugitani .................... F16H 1/46
                                                           475/339
(Continued)

FOREIGN PATENT DOCUMENTS

| CN | 1776252 | 5/2006 |
| CN | 2856587 | 1/2007 |

(Continued)

OTHER PUBLICATIONS

Yu, "KHV Planetary Gearing," Gear Technology; pp. 21-48, Nov./Dec. 1987.

*Primary Examiner* — Tisha D Lewis
(74) *Attorney, Agent, or Firm* — JMB Davis Ben-David

(57) ABSTRACT

Provided herein are a transmission method and a device for coaxially outputting autorotation and revolution. The axis of a power output shaft (17) and the axis of a crank of a power input shaft (1) are coincided with each other. The power output shaft (17) revolves around the axis of a main shaft of the power input shaft (1), and the revolution speed equals to the rotation speed of the power input shaft (1). After the (Continued)

superposition of a transition gear train (A) and a K-H-V few-tooth-difference planetary gear train (B), a driving force of the power input shaft (1) enables the power output shaft (17) to generate the autorotation which has the same speed as that of the power input shaft (1) but in the opposite direction, and at the same time, a thrust bearing (19) coaxial with the power output shaft (17) is connected to a thrust bearing (18) coaxial with the main shaft of the power input shaft (1) in series to bear axial loads. The transmission device for coaxially outputting autorotation and revolution is mainly formed by the power input shaft (1), the transition gear train (A), the K-H-V few-tooth-difference planetary gear train (B), the thrust bearings (18, 19) connected in series, and the power output shaft (17), etc. The device can be combined with a plasticizing delivery device using an eccentric rotor and having pulsed volume deformation to form an extruder.

7 Claims, 3 Drawing Sheets

(51) Int. Cl.
*B29C 48/25* (2019.01)
*F04C 15/00* (2006.01)
*F04C 2/107* (2006.01)

(52) U.S. Cl.
CPC ........ *F16H 37/0833* (2013.01); *F04C 2/1073* (2013.01); *F16H 2001/322* (2013.01); *F16H 2001/323* (2013.01)

(56) References Cited

U.S. PATENT DOCUMENTS

| | | | |
|---|---|---|---|
| 2015/0011348 A1* | 1/2015 | Vester | B01F 11/0014 475/175 |
| 2015/0013489 A1* | 1/2015 | Akami | F16H 1/32 74/421 R |
| 2015/0369339 A1* | 12/2015 | Okimura | F16H 1/32 475/162 |
| 2017/0152011 A1* | 6/2017 | Wang | B63H 1/36 |

FOREIGN PATENT DOCUMENTS

| | | |
|---|---|---|
| CN | 1966329 | 5/2007 |
| CN | 102221069 | 10/2011 |
| CN | 103742609 | 4/2014 |
| CN | 105065582 | 11/2015 |
| JP | S60146939 | 8/1985 |
| JP | S63243547 | 10/1988 |

\* cited by examiner

TRANSMISSION METHOD AND DEVICE FOR COAXIALLY OUTPUTTING AUTOROTATION AND REVOLUTION

CROSS-REFERENCE TO RELATED APPLICATIONS

This is the U.S. National Stage of International Application No. PCT/CN2015/083884 filed Jul. 13, 2015, which in turn claims the benefit of Chinese Patent Application No. 01510260601.0, filed May 20, 2015.

FIELD OF THE INVENTION

The present invention relates to the field of mechanical transmission technology, and more particularly to a transmission method and device for coaxially outputting rotation and revolution.

BACKGROUND OF THE INVENTION

Modern mechanical transmission, mainly referring to transmission of power and motion by mechanical means, is widely used in the mechanical engineering. Currently, most mechanical transmission mechanisms are single-input, single-output transmission. However, in some special mechanical engineering fields, an actuator requires the coaxial rotation and revolution. For example, in the field of petrochemical industry, volumetric fluid transport machinery mostly has the positive-displacement pump structure, which uses the rotation and revolution of a rotor in the inner cavity of a stator to realize the volumetric fluid transport process. In the field of polymer materials processing machinery, some plasticization transport devices require the transmission mechanism to uniaxially output the rotation and revolution.

In the conventional mechanical engineering devices, a rotor often needs to rotate and revolve at the same time, which, however, is achieved by cooperation of the stator and rotor of the actuator, the transmission system of the engineering machinery only passively receiving such a composite motion of the rotor shaft by a universal coupling instead of initiatively outputting the rotation and revolution. A conventional universal coupling-based transmission mechanism, when being connected with a rotation-revolution actuator, can only rely on meshing of the rotor with the stator to passively achieve revolution, with the axial load generated in the process of transport mostly needing to be born by the stator and rotor, which reduces the overall stability of the transmission system, resulting in such problems as unstable rotor operation, worn and deformed rotor and inner cavity of the stator. Currently, there is not yet a transmission device that coaxially outputs rotation and revolution and can bear the axial load.

Therefore, for overcoming the above problems, it is significant to develop a new transmission method and device that coaxially outputs rotation and revolution and can bear the axial load.

CONTENTS OF THE INVENTION

For overcoming the defects of the prior art, a purpose of the present invention is to provide a transmission method for coaxially outputting rotation and revolution, which can effectively increase the overall rigidity and bearing capacity of the system and improve stability of the motion mechanism.

Another purpose of the present invention is to provide a transmission device for coaxially outputting rotation and revolution that is used to realize the above method.

The technical solutions of the present invention include the following one:

1. A transmission method for coaxially outputting rotation and revolution is provided, wherein the power input shaft is an eccentric shaft including a spindle and a crank shaft connected with each other; the power output shaft revolves around the spindle axis of the power input shaft, and meanwhile rotates reversely at the same speed around its own axis and can bear the axial load, with the process specifically as follows:

The power input shaft, through transmission of the K-H-V planetary gear train with small teeth difference, is used to make the axis of the power output shaft coincide with the crank-shaft axis of the power input shaft, and make the power output shaft revolve around the spindle axis of the power input shaft, with the revolutional speed equal to the rotational speed of the power input shaft; meanwhile, the main power of the power input shaft, through superposition of the transition gear train on the K-H-V planetary gear train with small teeth difference, makes the power output shaft rotate reversely at the same speed to the power input shaft; a series thrust bearing set is used to bear the axial load.

A transmission device for coaxially outputting rotation and revolution that is used to realize the above method is mainly composed of a power input shaft, a transition gear train, a K-H-V planetary gear train with small teeth difference, an eccentric motion frame, a power output shaft, a series thrust bearing set and a stand;

the power input shaft is an eccentric shaft including a spindle and a crank shaft connected with each other;

the transition gear train includes a power distribution main gear, a first transition gear and a second transition gear set;

the K-H-V planetary gear train with small teeth difference includes an internal-external gear and an output planetary gear;

the series thrust bearing set includes a first thrust bearing and a second thrust bearing;

the power distribution main gear is mounted on the spindle of the power input shaft, the eccentric motion frame is mounted on the crank shaft of the power input shaft, the power distribution main gear meshes with the first transition gear, the first transition gear meshes with one end of the second transition gear set, the other end of the second transition gear set meshes with the outer teeth of the internal-external gear, and the inner teeth of the internal-external gear mesh with an output planetary gear that is mounted on the power output shaft;

preferably, the spindle of the power input shaft is provided with a first deep groove ball bearing, the first transition gear is provided with a second deep groove ball bearing, the second transition gear set is provided with a third deep groove ball bearing, the eccentric motion frame is provided with a fourth deep groove ball bearing and a seventh deep groove ball bearing, the internal-external gear is provided with a fifth deep groove ball bearing, the output planetary gear is provided with an eighth deep groove ball bearing, and the power output shaft is provided with a sixth deep groove ball bearing and a ninth deep groove ball bearing; the first, second, third, fourth, fifth and sixth deep groove ball bearings are provided on the stand, respectively, the seventh deep groove ball bearing is provided on the eccentric motion frame, the eighth deep groove ball bearing is provided on the output planetary gear, and the ninth deep groove ball bearing is provided on the power output shaft.

The first thrust bearing is coaxial with the spindle of the power input shaft and provided at the rear end of the eccentric motion frame, and the second thrust bearing is coaxial with the power output shaft and provided at the rear end of the output planetary gear.

Wherein the second transition gear set includes two second transition gears that are connected with each other through the second transition gear shaft and provided at both ends of the second transition gear shaft, respectively, the second transition gear at one end meshing with the first transition gear, the second transition gear at the other end meshing with the outer teeth of the internal-external gear.

The above transmission device for coaxially outputting rotation and revolution can be driven directly by a motor, a hydraulic motor or other power devices; the power input shaft, after being driven by the power device, drives the power output shaft to revolve through the K-H-V planetary gear train with small teeth difference (that is, when the power input shaft rotates, the power output shaft rotates around the inner periphery of the internal-external gear through the output planetary gear, thus realizing the eccentric revolution); through superposition of the transition gear train on the K-H-V planetary gear train with small teeth difference, the output planetary gear drives the power output shaft to rotate and makes the rotation reverse and at the same speed to the revolution; the thrust bearing that makes rotation and revolution and is coaxial with the power output shaft and the thrust bearing coaxial with the spindle of the power input shaft are connected in series to bear the axial load. The axial load is transferred to the output planetary gear via the power output shaft, and is transferred to the eccentric motion frame via the second thrust bearing coaxial with the power output shaft, and is transferred via the eccentric motion frame and the first thrust ball bearing coaxial with the spindle of the power input shaft, and is finally born by the stand.

The above transmission device for coaxially outputting rotation and revolution can be combined with an eccentric rotor volume pulsation deformation plasticization transport device to constitute an extruder.

2. A transmission method for coaxially outputting rotation and revolution is provided, wherein the power output shaft revolves around the axis of the power input shaft, and meanwhile rotates reversely at the same speed around its own axis and can bear the axial load, with the process specifically as follows:

The power input shaft, through transmission of a universal joint drive system, is used to make the axis of the power output shaft eccentric relative to the axis of the power input shaft and, through transmission of the transition gear train, make the power output shaft revolve around the axis of the power input shaft, with the revolutional speed equal to the rotational speed of the power input shaft and the revolutional direction reverse to the rotational direction of the power input shaft; meanwhile, the main power of the power input shaft, through transmission of the universal joint drive system, makes the power output shaft rotate equidirectionally at the same speed to the power input shaft; and a series thrust bearing set is used to bear the axial load.

A transmission device for coaxially outputting rotation and revolution that is used to realize the above method is mainly composed of a power input shaft, a transition gear train, a universal joint drive system, an eccentric motion frame, a power output shaft, a series thrust bearing set and a stand;

the transition gear train includes a power distribution main gear, a first transition gear, a second transition gear set, and a power output gear;

the universal joint drive system includes two universal joints connected in series;

the series thrust bearing set includes a first thrust bearing and a second thrust bearing;

the power input shaft is connected with the power output shaft through the two series universal joints, and the power output shaft is eccentrically provided relative to the power input shaft;

the power distribution main gear is mounted on the power input shaft, the eccentric motion frame is mounted on the power output shaft, the power distribution main gear meshes with the first transition gear, the first transition gear meshes with one end of the second transition gear set, the other end of the second transition gear set meshes with the power output gear, and the power output shaft goes through the power output gear;

preferably, the power input shaft is provided with a first deep groove ball bearing, the first transition gear is provided with a second deep groove ball bearing, the second transition gear set is provided with a third deep groove ball bearing, the frame is provided with a fourth deep groove ball bearing and a seventh deep groove ball bearing, the power output gear is provided with a fifth deep groove ball bearing and an eighth deep groove ball bearing, and the power output shaft is provided with a sixth deep groove ball bearing and a ninth deep groove ball bearing; the first, second, third, fourth, fifth and sixth deep groove ball bearings are provided on the stand, respectively, the seventh deep groove ball bearing is provided on the eccentric motion frame, the eighth deep groove ball bearing is provided on the power output gear, and the ninth deep groove ball bearing is provided on the power output shaft.

The first thrust bearing is coaxial with the power input shaft and provided at the rear end of the eccentric motion frame, and the second thrust bearing is coaxial with the power output shaft and provided at the rear end of the power output gear.

Wherein the second transition gear set includes two second transition gears that are connected with each other through the second transition gear shaft and provided at both ends of the second transition gear shaft, respectively, the second transition gear at one end meshing with the first transition gear, the second transition gear at the other end meshing with the power output gear.

The above transmission device for coaxially outputting rotation and revolution can be driven directly by a motor, a hydraulic motor or other power devices; after the power device drives the power input shaft, the superposition of the universal joint drive system on the transition gear train makes the power output shaft revolve eccentrically; meanwhile, the power input shaft directly drives the power output shaft to rotate through the universal joint drive system, with the rotation reverse and at the same speed to the revolution; the first thrust ball bearing coaxial with the power input shaft and the second thrust ball bearing coaxial with the power output shaft are connected in series to bear the axial load. The axial load is transferred via the power output shaft to the second thrust bearing coaxial with the power output shaft, and is transferred via the eccentric motion frame to the first thrust bearing coaxial with the power input shaft, and is finally born by the stand.

The above transmission device for coaxially outputting rotation and revolution can be combined with an eccentric rotor volume pulsation deformation plasticization transport device to constitute an extruder.

The present invention has the following beneficial effects compared to the prior art:

This transmission method and device for coaxially outputting rotation and revolution can be applied to an eccentric rotor extruder, so as to solve the problems such as poor transmission stability, unstable rotor operation, worn and deformed rotor and inner cavity of the stator during revolution of the transmission system in the processing process of the eccentric rotor extruder.

This transmission device for coaxially outputting rotation and revolution has simple and compact structure, strong bearing capacity, and high transmission efficiency; relative to the conventional universal coupling-based transmission mechanism, this transmission device can bear greater axial pressure and deviator load, and effectively improve the high speed stability of the connected rotor; besides, the extrusion pressure of the eccentric rotor extrusion system is not limited, thus realizing the processing technology of the high-yield and high-torque directly formed products of the polymer materials.

DETAILED DESCRIPTION OF THE EMBODIMENTS

The present invention will be further described in detail below with reference to exemples; however, the embodiments of the present invention are not limited thereto.

EXAMPLE 1

This example provides a transmission method for coaxially outputting rotation and revolution, wherein the power input shaft is an eccentric shaft including a spindle and a crank shaft connected with each other; the power output shaft revolves around the spindle axis of the power input shaft, and meanwhile rotates reversely at the same speed around its own axis and can bear the axial load, with the process specifically as follows:

The power input shaft, through transmission of the K-H-V planetary gear train with small teeth difference, is used to make the axis of the power output shaft coincide with the crank-shaft axis of the power input shaft, and make the power output shaft revolve around the spindle axis of the power input shaft, with the revolutional speed equal to the rotational speed of the power input shaft; meanwhile, the main power of the power input shaft, through superposition of the transition gear train on the K-H-V planetary gear train with small teeth difference, makes the power output shaft rotate reversely at the same speed to the power input shaft; the second thrust bearing that makes rotation and revolution and is coaxial with the power output shaft and the first thrust bearing coaxial with the spindle of the power input shaft are connected in series to bear the axial load.

Figure 1:
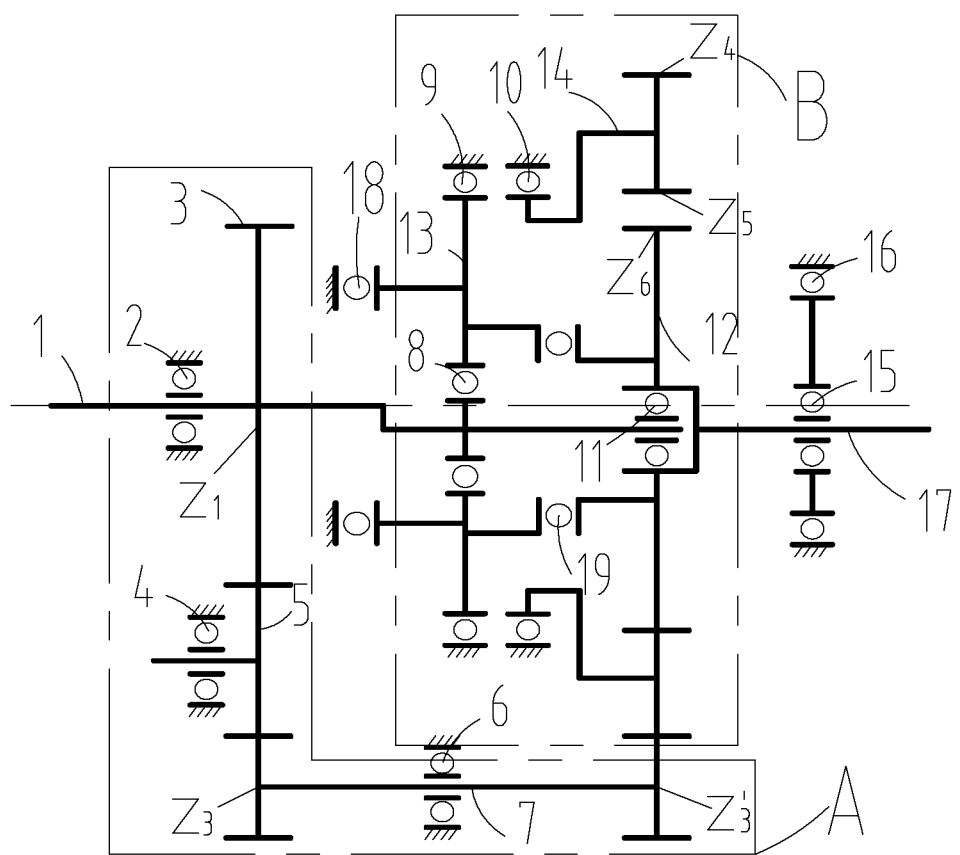
FIG. 1 is a schematic diagram of the principle of Example 1 of this transmission device for coaxially outputting rotation and revolution.

In this method, the number of gear teeth satisfies the following relationship:

$$\frac{2Z_6}{Z_5} = \frac{Z_1 Z_3'}{Z_3 Z_4} + 1$$

Wherein $Z_1$ is the number of teeth of the power distribution main gear, $Z_3$ is the number of teeth of the second transition gear meshing with the first transition gear, $Z_3'$ is the number of teeth of the second transition gear meshing with the internal-external gear, $Z_4$ is the number of outer teeth of the internal-external gear, $Z_5$ is the number of inner teeth of the internal-external gear, and $Z_6$ is the number of teeth of the output planetary gear (specifically as shown in FIG. 1).

A transmission device for coaxially outputting rotation and revolution that is used to realize the above method, as shown in FIG. 1, is mainly composed of a power input shaft 1, a transition gear train A, a K-H-V planetary gear train B with small teeth difference, an eccentric motion frame 13, a power output shaft 17, a series thrust bearing set, a first deep groove ball bearing 2, a second deep groove ball bearing 4, the third deep groove ball bearing 6, the fourth deep groove ball bearing 9, the fifth deep groove ball bearing 10, the sixth deep groove ball bearing 16, the seventh deep groove ball bearing 8, the eighth deep groove ball bearing 11, the ninth deep groove ball bearing 15 and a stand; the series thrust bearing set includes a first thrust ball bearing 18 and a second thrust ball bearing 19; the transition gear train A includes a power distribution main gear 3, a first transition gear 5 and a second transition gear set 7; the K-H-V planetary gear train with small teeth difference includes an internal-external gear 14 and an output planetary gear 12; the power distribution main gear is mounted on the spindle of the power input shaft and meshes with the first transition gear, the first transition gear meshes with one end of the second transition gear set, the other end of the second transition gear set meshes with the outer teeth of the internal-external gear, and the inner teeth of the internal-external gear mesh with an output planetary gear that is mounted on the power output shaft;

the spindle of the power input shaft is provided with a first deep groove ball bearing, the first transition gear is provided with a second deep groove ball bearing, the second transition gear set is provided with a third deep groove ball bearing, the eccentric motion frame is provided with a fourth deep groove ball bearing and a seventh deep groove ball bearing, the internal-external gear is provided with a fifth deep groove ball bearing, the output planetary gear is provided with an eighth deep groove ball bearing, and the power output shaft is provided with a sixth deep groove ball bearing and a ninth deep groove ball bearing; the first, second, third, fourth, fifth and sixth deep groove ball bearings are provided on the stand, the seventh deep groove ball bearing is provided on the eccentric motion frame, the eighth deep groove ball bearing is provided on the output planetary gear, and the ninth deep groove ball bearing is provided on the power output shaft.

The first thrust bearing is coaxial with the spindle of the power input shaft and provided at the rear end of the eccentric motion frame, and the second thrust bearing is coaxial with the power output shaft and provided at the rear end of the output planetary gear. Wherein the second transition gear set includes two second transition gears that are connected with each other through the second transition gear shaft and provided at both ends of the second transition gear shaft, respectively, the second transition gear at one end meshing with the first transition gear, the second transition gear at the other end meshing with the outer teeth of the internal-external gear.

The above transmission device for coaxially outputting rotation and revolution can be driven directly by a motor, a hydraulic motor or other power devices; power is inputted via the power input shaft, drives the power distribution main gear to rotate and, via the power input shaft, makes the output planetary gear revolve around the spindle axis of the power input shaft equidirectionally at the same speed to the power input shaft, with the output planetary gear driving the power output shaft to revolve around the spindle axis of the power input shaft; meanwhile, the main power, successively via meshing of the power distribution main gear and the power distribution main gear with the first transition gear, meshing of the first transition gear with the second transition gear set, and meshing of the second transition gear set with the outer teeth of the internal-external gear, drives the internal-external gear to rotate, which drives the output planetary gear to rotate, which then drives the power output shaft to rotate reversely at the same speed, thus realizing the composite motion of the rotation and the revolution reverse at the same speed of the power output shaft; the axial load is transferred to the output planetary gear via the power output shaft, transferred to the eccentric motion frame via the second thrust ball bearing coaxial with the power output shaft, and transferred via the eccentric motion frame and the first thrust ball bearing coaxial with the power input shaft, and is finally born by the stand.

EXAMPLE 2

This example provides a transmission method for coaxially outputting rotation and revolution, wherein the power output shaft revolves around the axis of the power input shaft, and meanwhile rotates reversely at the same speed around its own axis and can bear the axial load, with the process specifically as follows:

The power input shaft, through transmission of a universal joint drive system, is used to make the axis of the power output shaft eccentric relative to the axis of the power input shaft and, through transmission of the transition gear train, make the power output shaft revolve around the axis of the power input shaft, with the revolutional speed equal to the rotational speed of the power input shaft and the revolutional direction reverse to the rotational direction of the power input shaft; meanwhile, the main power of the power input shaft, through transmission of the universal joint drive system, makes the power output shaft rotate equidirectionally at the same speed to the power input shaft; the second thrust bearing that makes rotation and revolution and is coaxial with the power output shaft and the first thrust bearing coaxial with the power input shaft are connected in series to bear the axial load.

Figure 2:
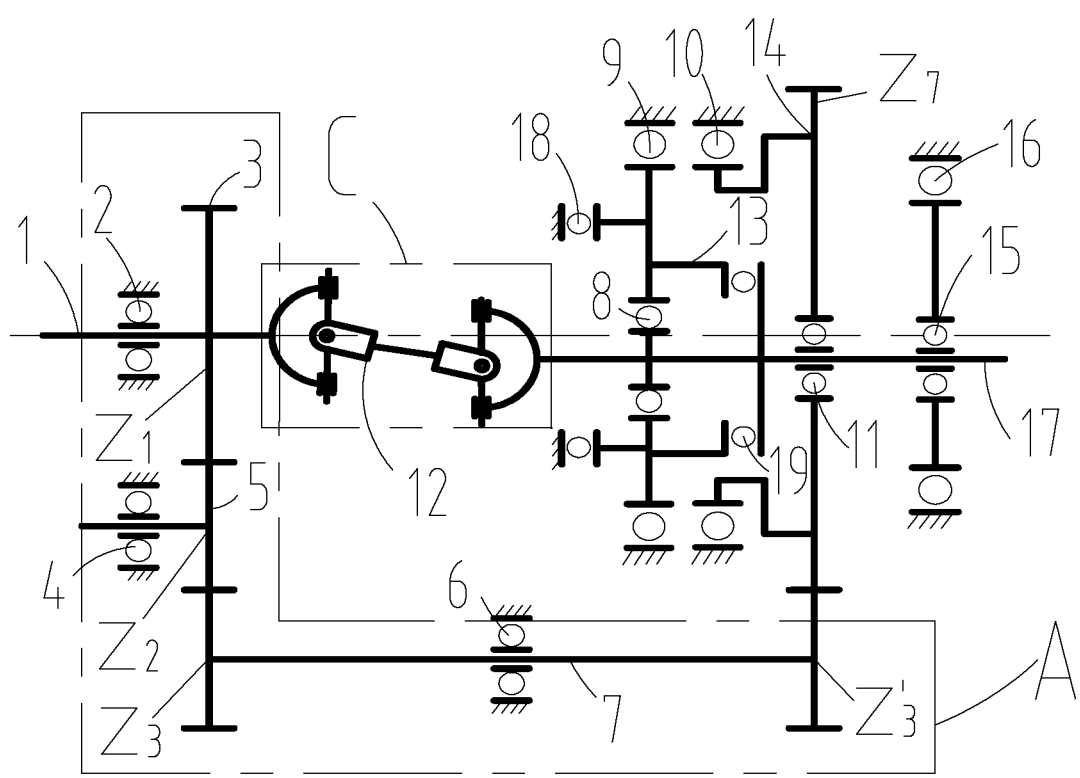
FIG. 2 is a schematic diagram of the principle of Example 2 of this transmission device for coaxially outputting rotation and revolution.

In this method, the number of gear teeth satisfies the following relationship:

$Z_1 = Z_7$ $Z_2 = Z_3 = Z_3$

Wherein $Z_1$ is the number of teeth of the power distribution main gear, $Z_2$ is the number of teeth of the first transition gear, $Z_3$ is the number of teeth of the second transition gear meshing with the first transition gear, $Z_3'$ is the number of teeth of the second transition gear meshing with the internal-external gear, and $Z_7$ is the number of teeth of the power output gear (specifically as shown in FIG. 2).

A transmission device for coaxially outputting rotation and revolution that is used to realize the above method, as shown in FIG. 2, is mainly composed of a power input shaft 1, a transition gear train A, a universal joint drive system C, a power output shaft 17, an eccentric motion frame 13, a first deep groove ball bearing 2, a second deep groove ball bearing 4, a third deep groove ball bearing 6, a fourth deep groove ball bearing 9, a fifth deep groove ball bearing 10, a sixth deep groove ball bearing 16, a seventh deep groove ball bearing 8, an eighth deep groove ball bearing 11, a ninth deep groove ball bearing 15, a series thrust bearing set and a stand; the transition gear train includes a power distribution main gear 3, a first transition gear 5, a second transition gear set 7, and a power output gear 14; the universal joint drive system includes two universal joints 12 connected in series; the series thrust bearing set includes a first thrust ball bearing 18 and a second thrust ball bearing 19;

the power input shaft is connected with the power output shaft through the two series universal joints, and the power output shaft is eccentrically provided relative to the power input shaft; the power distribution main gear is mounted on the power input shaft, the eccentric motion frame is mounted on the power output shaft, the power distribution main gear meshes with the first transition gear, the first transition gear meshes with one end of the second transition gear set, the other end of the second transition gear set meshes with the power output gear, and the power output shaft goes through the power output gear.

The power input shaft is provided with the first deep groove ball bearing, the first transition gear is provided with the second deep groove ball bearing, the second transition gear set is provided with the third deep groove ball bearing, the eccentric motion frame is provided with the fourth deep groove ball bearing and the seventh deep groove ball bearing, the power output gear is provided with the fifth deep groove ball bearing and the eighth deep groove ball bearing, and the power output shaft is provided with the sixth deep groove ball bearing and the ninth deep groove ball bearing; the first, second, third, fourth, fifth and sixth deep groove ball bearings are provided on the stand, the seventh deep groove ball bearing is provided on the eccentric motion frame, the eighth deep groove ball bearing is provided on the power output gear, and the ninth deep groove ball bearing is provided on the power output shaft.

The first thrust bearing is coaxial with the power input shaft and provided at the rear end of the eccentric motion frame, and the second thrust bearing is coaxial with the power output shaft and provided at the rear end of the power output gear.

Wherein the second transition gear set includes two second transition gears that are connected with each other through the second transition gear shaft and provided at both ends of the second transition gear shaft, respectively, the second transition gear at one end meshing with the first transition gear, the second transition gear at the other end meshing with the power output gear.

The above transmission device for coaxially outputting rotation and revolution can be driven directly by a motor, a hydraulic motor or other power devices; the main power is inputted via the power input shaft and, via the universal joint drive system, drives the power output shaft to rotate equidirectionally at the same speed to the power input shaft;

meanwhile, the power input shaft drives the power distribution main gear to rotate, which drives the first transition gear to rotate, which drives the second transition gear set to rotate, which drives the power output gear to rotate, which drives the power output shaft to revolve around the axis of the power input shaft reversely at the same speed to the power input shaft, thus realizing the composite motion of the rotation and the revolution reverse at the same speed of the power output shaft; the axial load is transferred via the power output shaft to the second thrust ball bearing coaxial with the power output shaft, is transferred via the eccentric motion frame to the first thrust ball bearing coaxial with the power input shaft, and is finally born by the stand.

EXAMPLE 3

This example provides an extruder constituted by the combination of the transmission device for coaxially outputting rotation and revolution with an eccentric rotor volume pulsation deformation plasticization transport device.

Wherein the transmission device I for coaxially outputting rotation and revolution may be the transmission device described in Example 1 or 2. The eccentric rotor volume pulsation deformation plasticization transport device II may be the one disclosed in the patent application No. 201410206552.8 and, as shown in FIG. 4, includes a stator 21 and a rotor 22.

Figure 3:
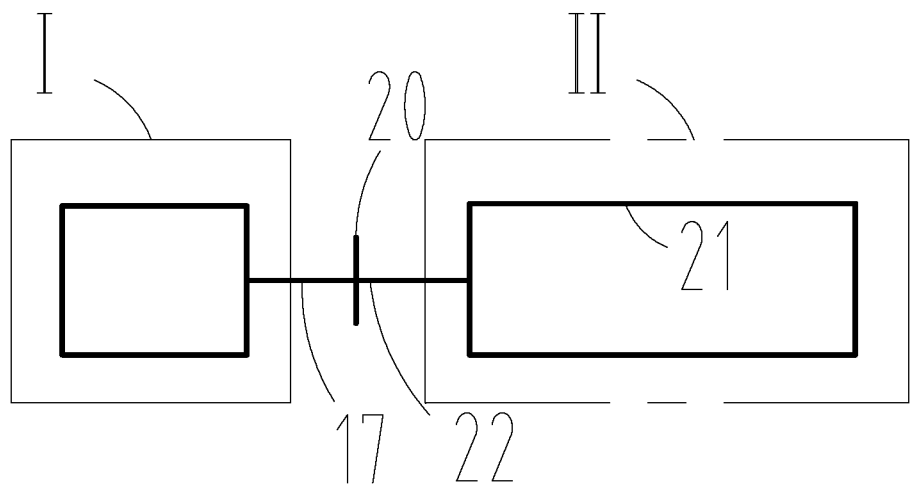
FIG. 3 is a schematic diagram of the principle of Example 3 of this transmission device for coaxially outputting rotation and revolution.

As shown in FIG. 3, the transmission device I for coaxially outputting rotation and revolution is connected with the eccentric rotor volume pulsation deformation plasticization transport device II via a connector 20. The power output shaft 17 is connected to the rotor connector 20, and the rotor 22 is provided in the inner cavity of the stator 21, with the connector 20 provided at one end of the rotor.

Figure 4:
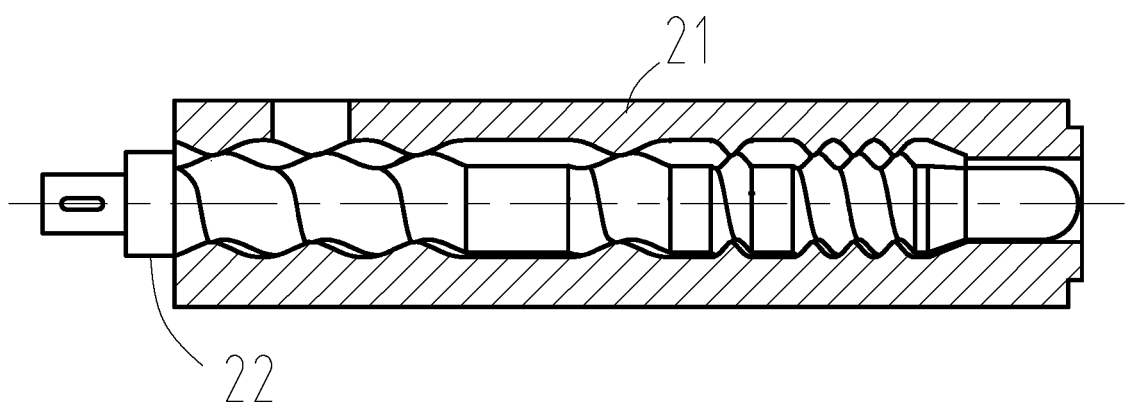
FIG. 4 is a schematic diagram of the structure of the eccentric rotor volume pulsation deformation plasticization transport device II in FIG. 3.

While in use, the power output shaft 17 of the transmission device for coaxially outputting rotation and revolution produces revolution and rotation reverse and at the same speed to the revolution (as described in Example 1) or rotation and revolution reverse and at the same speed to the rotation (as described in Example 2), and drives the rotor 22 to rotate and revolve reversely at the same speed to the rotation in the stator 21 (as shown in FIG. 4); the rolling of the eccentric rotor in the inner cavity of the stator during its rotation and revolution reverse and at the same speed to the rotation causes the volume of the space between the eccentric rotor and the stator to periodically change alternatively along the axial and radial directions of the stator, and the materials between the stator and the rotor bear the volume pulsation deformation when being periodically compressed and released, thus completing the plasticization transport process including solid compaction, exhaust, melt plasticization, mixing, and melt transport.

The extruder constituted by the combination of this transmission device for coaxially outputting rotation and revolution with the eccentric rotor plasticization transport device has simple and compact structure, strong bearing capacity, and high transmission efficiency; this transmission device can bear greater axial pressure and deviator load, and effectively improve the high speed stability of the connected rotor; besides, the extrusion pressure of the extrusion system is not limited, thus realizing the processing technology of the high-yield and high-torque directly formed products of the polymer materials.

The present invention can be well implemented as described above. The examples as described above are merely the preferred ones of the present invention, and are not intended to limit the scope of the present invention; that is, variations and modifications consistent with the present invention are intended to be encompassed by the scope of the present invention as defined by the appended claims.

What is claimed is:

1. A transmission method for coaxially outputting rotation and revolution, characterized in that: a power input shaft is an eccentric shaft including a spindle and a crank shaft connected with each other; a power output shaft revolves around a spindle axis of the power input shaft, and at the same time rotates reversely at the same speed around its own axis and bears an axial load, with the method specifically as follows:

the power input shaft, through transmission of a K-H-V planetary gear train with small teeth difference, is used to make the axis of the power output shaft coincide with a crank-shaft axis of the power input shaft, and make the power output shaft revolve around the spindle axis of the power input shaft, with the revolutional speed equal to the rotational speed of the power input shaft; meanwhile, main power of the power input shaft, through superposition of the transition gear train on the K-H-V planetary gear train with small teeth difference, makes the power output shaft rotate reversely at the same speed to the power input shaft; and a series thrust bearing set is used to bear the axial load.

2. A transmission device for coaxially outputting rotation and revolution, characterized in that: this device is mainly composed of a power input shaft, a transition gear train, a K-H-V planetary gear train with small teeth difference, an eccentric motion frame, a power output shaft, a series thrust bearing set and a stand;

the power input shaft is an eccentric shaft including a spindle and a crank shaft connected with each other;
the transition gear train includes a power distribution main gear, a first transition gear and a second transition gear set;
the K-H-V planetary gear train with small teeth difference includes an internal-external gear and an output planetary gear;
the series thrust bearing set includes a first thrust bearing and a second thrust bearing;
the first thrust bearing is coaxial with the spindle of the power input shaft and provided at the rear end of the eccentric motion frame, and the second thrust bearing is coaxial with the power output shaft and provided at the rear end of the output planetary gear;
the power distribution main gear is mounted on the spindle of the power input shaft, the eccentric motion frame is mounted on the crank shaft of the power input shaft, the power distribution main gear meshes with the first transition gear, the first transition gear meshes with one end of the second transition gear set, the other end of the second transition gear set meshes with outer teeth of the internal-external gear, inner teeth of the internal-external gear mesh with the output planetary gear that is mounted on the power output shaft.

3. The transmission device for coaxially outputting rotation and revolution according to claim 2, characterized in that: the spindle of the power input shaft is provided with a first deep groove ball bearing, the first transition gear is provided with a second deep groove ball bearing, the second transition gear set is provided with a third deep groove ball bearing, the eccentric motion frame is provided with a fourth deep groove ball bearing and a seventh deep groove ball bearing, the internal-external gear is provided with a fifth deep groove ball bearing, the output planetary gear is provided with an eighth deep groove ball bearing, and the power output shaft is provided with a sixth deep groove ball bearing and a ninth deep groove ball bearing; the first, second, third, fourth, fifth and sixth deep groove ball bearings are provided on the stand, respectively, the seventh deep groove ball bearing is provided on the eccentric motion frame, the eighth deep groove ball bearing is provided on the output planetary gear, and the ninth deep groove ball bearing is provided on the power output shaft.

4. The transmission device for coaxially outputting rotation and revolution according to claim 2, characterized in that: the second transition gear set includes two second transition gears that are connected with each other through a second transition gear shaft and provided at both ends of the second transition gear shaft, respectively, the second transition gear at one end meshing with the first transition gear, the second transition gear at the other end meshing with the outer teeth of the internal-external gear.

5. The transmission device for coaxially outputting rotation and revolution according to claim 2, characterized in that: the transmission device is combined with an eccentric rotor volume pulsation deformation plasticization transport device to constitute an extruder.

6. The transmission device for coaxially outputting rotation and revolution according to claim 3, characterized in that: the transmission device is combined with an eccentric rotor volume pulsation deformation plasticization transport device to constitute an extruder.

7. The transmission device for coaxially outputting rotation and revolution according to claim 4, characterized in that: the transmission device is combined with an eccentric rotor volume pulsation deformation plasticization transport device to constitute an extruder.

\* \* \* \* \*